United States Patent
Wada

[11] Patent Number: 5,694,762
[45] Date of Patent: Dec. 9, 1997

[54] EXTERNAL COMBUSTION TYPE GAS TURBINE APPARATUS

[75] Inventor: Nobuaki Wada, Takasago, Japan

[73] Assignee: Mitsubishi Jukogyo Kabushiki Kaisha, Tokyo, Japan

[21] Appl. No.: 584,181

[22] Filed: Jan. 11, 1996

[30] Foreign Application Priority Data

Jan. 10, 1995 [JP] Japan ................................ 7-001871

[51] Int. Cl.$^6$ ...................................................... F02C 9/00
[52] U.S. Cl. ...................... 60/39.23; 60/39.29; 60/39.464
[58] Field of Search ............................... 60/39.23, 39.29, 60/39.181, 39.464; 110/245, 163, 348

[56] References Cited

U.S. PATENT DOCUMENTS

| 4,315,400 | 2/1982 | Cole et al. ........................ 60/39.464 |
| 4,498,286 | 2/1985 | Brannstrom et al. .............. 60/39.464 |
| 4,860,535 | 8/1989 | Månsson et al. .................. 60/39.464 |

FOREIGN PATENT DOCUMENTS 63-230927  9/1988  Japan .

*Primary Examiner*—Charles G. Freay
*Attorney, Agent, or Firm*—Wenderoth, Lind & Ponack

[57] ABSTRACT

A high temperature gas pipe (4) from a combustion furnace to a turbine (2), having a high temperature gas shut-off valve (10a); a high pressure air leading passage (9) from a compressor (3); a first air passage (7a) connecting the high pressure air leading passage (9) and a downstream portion of the high temperature gas shut-off valve (10a) of the high temperature gas pipe (4) via a first air selector valve (8a); and a second air passage (7) connecting the high pressure air leading passage (9) and a high pressure air pipe (6) to the combustion furnace via a second air selector valve (8b) are provided within a chamber (5). Further, the high temperature gas shut-off valve (10a) and the first and second air selector valves (8a, 8b) are driven by a single valve shaft (12).

11 Claims, 4 Drawing Sheets

1

EXTERNAL COMBUSTION TYPE GAS TURBINE APPARATUS

BACKGROUND OF THE INVENTION

1. Field of the Invention

The present invention relates to an external combustion type gas turbine apparatus to drive a turbine by a high temperature gas generated at a combustion furnace of a pressurized fluidized bed combustion apparatus (hereinafter referred to as "PFBC"), a hydrogen combustion apparatus, etc.

2. Description of the Prior Art

A conventional external combustion type gas turbine apparatus to drive a turbine by a high temperature gas generated at a PFBC is shown in FIG. 4. In this apparatus, a gas turbine 1 is composed of a turbine 2 and a compressor 3 connected directly to the turbine 2. High pressure air from the compressor 3 is supplied to a PFBC 31 for combustion of fuel, and a high temperature gas generated at the PFBC 31 is led into the turbine 2 to drive the turbine 2 as well as the load of a generator 19 etc. connected in a shafting arrangement.

The high temperature gas of the PFBC 31 is led into the turbine 2 via a high temperature gas shut-off valve 44, and the high pressure air of the compressor 3 is led into the PFBC 31 through an air passage where a compressed air selector valve 43 and a PFBC pressure-rise valve 41 are provided in parallel to each other. The high pressure air is connected to a high temperature gas passage connecting the PFBC 31 and the turbine 2 through an air passage where the air selector valve 43 and a PFBC bypass valve 42 are provided in parallel to each other. Numeral 45 designates a discharge valve of the high temperature gas of the PFBC 31.

Incidentally, in FIG. 4, numeral 20 designates a gas turbine body portion composed of the turbine 2 and the compressor 3, numeral 30 designates a PFBC portion composed of the PFBC 31, numeral 40 designates a high pressure air and high temperature gas pipe portion composed for passages of the high temperature gas and the high pressure air as well as the PFBC pressure-rise valve 41, the PFBC bypass valve 42, the air selector valve 43, the high temperature gas shut-off valve 44 and the discharge valve 45.

In the conventional external combustion type gas turbine apparatus, the high pressure air from the compressor 3 is led into the PFBC 31 for combustion of fuel and the high temperature gas generated at the PFBC 31 is led into the turbine 2 to drive the turbine 2. While the turbine 2 does not operate, the high temperature gas from the PFBC 31 is shut off by the high temperature gas shut-off valve 44 and the high pressure air to the PFBC 31 is shut off by the air selector valve 43 so as to flow into the turbine 2. Thereby a discharge air passage from the compressor 3, which is running by inertail force, is secured, and an obstacle of the compressor 3, such as a surging etc., is prevented. Incidentally, the high temperature gas of the PFBC 31 is discharged by the discharge valve 45, but this is not necessarily linked with the high temperature gas shut-off valve 44 and the air selector valve 43.

In the conventional external combustion type gas turbine apparatus, there are such shortcomings to be solved as follows:

(1) The pipings composing the high temperature passages are required to be of a complicated structure applied by a pipe inner surface heat insulation method for an inner fluid of a temperature of 800° to 1000° C. and of a pressure of several Pascals, hence they are very expensive and tend to be short on reliability. In the high-temperature gas shut-off valve there are also similar shortcomings.

(2) The air selector valve for changing the high pressure air from the compressor of the gas turbine to the PFBC or to the gas turbine and the shut-off valve of the high temperature gas from the PFBC to the gas turbine are provided inevitably and yet these valves must be operated jointly.

(3) The valves provided in the pipings are of such huge sizes, amounting to several meters in their entire length, and hence a large space is needed to install them, and there is a limitation on the responsiveness of the valves.

(4) As a result of the above, the high temperature gas shut-off valve is installed remotely from the gas turbine, and the inner volume of the turbine inlet pipings in addition to that of pipings from the air selector valve, becomes large. Hence in case of a load shut-off accident of the turbine apparatus, etc., there is a fear of excess rotation of the gas turbine.

(5) As the valves and pipings of complicated structures are assembled on site, a long period of construction is needed, which has a high cost.

SUMMARY OF THE INVENTION

It is therefore an object of the present invention to provide an external combustion type gas turbine apparatus which is able to solve the above-mentioned shortcomings.

An external combustion type gas turbine apparatus according to the present invention is constructed as follows:

(1) A high temperature gas pipe is provided within a chamber connecting a combustion furnace to a turbine. A temperature gas shut-off valve provided at the high temperature gas pipe within the chamber. A high pressure air leading passage provided within the chamber leads high pressure air from a compressor. A first air passage provided within the chamber, connects to the high pressure air leading passage and to a portion on the downstream side of the high temperature gas shut-off valve of the high temperature gas pipe via a first selector valve. A second air passage provided within the chamber connects to the high pressure air passage and to the combustion furnace via a second selector valve.

(2) In the external combustion type gas turbine apparatus mentioned in (1) above, the high pressure air leading passage leading the high pressure air from the compressor is provided within the chamber, surrounding the high temperature gas pipe.

(3) In the external combustion type gas turbine apparatus mentioned in (1) above, the high pressure air leading passage leading the high pressure air from the compressor is provided within the chamber, not surrounding the high temperature gas pipe, but as another pipe passage standing in parallel therewith.

(4) In the external combustion type gas turbine apparatus mentioned in (1) or (2) above, the second air passage connected to the combustion furnace via the second selector valve includes an annular passage formed between the high temperature gas pipe connecting the combustion furnace to the turbine and the high pressure air pipe surrounding the high temperature gas pipe.

(5) In the external combustion type gas turbine apparatus mentioned in (1) or (3) above, the second air passage connected to the combustion furnace via the second selector valve does not surround the high temperature gas pipe connecting the combustion furnace to the turbine, but forms another pipe passage standing in parallel therewith.

(6) In the external combustion type gas turbine apparatus mentioned in any one of (1) to (5) above, said high temperature gas shut-off valve and the first and second selector valves are driven by a single valve shaft.

(7) In the external combustion type gas turbine apparatus mentioned in any one of (1) to (6) above, the high temperature gas shut-off valve and the first and second selector valves are provided in a row on the same plane.

According to the present invention mentioned in (1) above, by the high temperature gas pipe, the high temperature gas shut-off valve and the first and second air selector valves etc. being provided within the chamber, these components can be placed closely to the gas turbine and the problem of an excess rotation of the gas turbine becoming large whether the load is shut-off due to excess piping volume which had occurred in the prior art due to dead spaces in the piping arrangement, can be solved.

Further, by the high temperature gas pipe, the high temperature gas shut-off valve and the first and second air selector valves etc. being provided within the chamber as mentioned above, the apparatus can be assembled at a factory and transported to a site as a unit. Hence a construction period at the site can be remarkably reduced, and a cost reduction thereby becomes possible.

According to the present invention mentioned in (2) above, by the high temperature gas pipe and the high temperature gas shut-off valve being provided within the chamber and further surrounded by the high pressure air leading passage within the chamber, their pressure resistant strength need only correspond to the pressure difference between the high temperature gas and the high pressure air, which is approximately 1/10 to 1/12 or 1/13 of the conventional difference. Hence the structure can be made simple and compact, and a countermeasure for leakage of the high temperature gas to the outside of the system can be facilitated. Further, by the high temperature gas pipe and the high temperature gas shut-off valve being provided within the chamber, their heat insulation structure becomes unnecessary and such structure as simply insulates the outside of the chamber will be enough. In this way, the high temperature gas pipe and the high temperature gas shut-off valve are made simple and compact. Thereby a reliability can be enhanced and a remarkable cost reduction becomes possible.

According to the present invention mentioned in (4) above, by the second air passage being connected to the combustion furnace via the second selector valve including the annular passage formed between the high temperature gas pipe connecting the combustion furnace to the turbine and the high pressure air pipe surrounding the high temperature gas pipe, a heat insulation structure of the portion surrounded by the high pressure pipe of the high temperature gas pipe connecting the combustion furnace to the turbine becomes unnecessary.

According to the present invention mentioned in (6) above, in addition to those functions mentioned above, by the high temperature gas shut-off valve and the first and second air selector valves provided within the chamber being driven by the single shaft and a shut-off of the high temperature gas and a change of the high pressure air being thereby performed, the necessary operations can be done with one action, or one valve open/close signal, and hence a reliability can be enhanced and a space can be reduced.

BRIEF DESCRIPTION OF THE DRAWINGS

In the accompanying drawings:

FIGS. 1 are drawings showing a first preferred embodiment according to the present invention, wherein

DESCRIPTION OF THE PREFERRED EMBODIMENTS

Figure 1A:
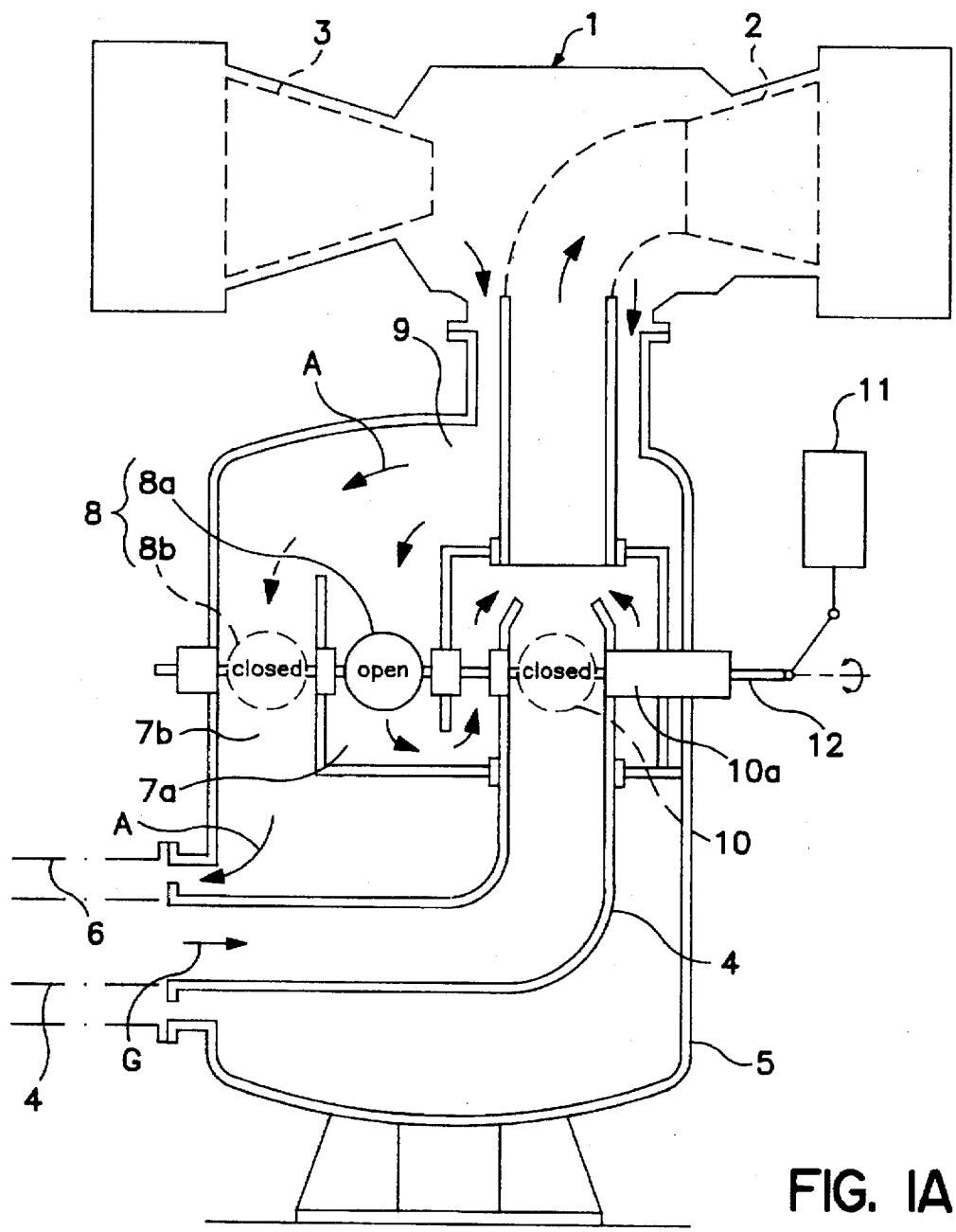
FIG. 1(a) is a sectional view of an apparatus and FIG. 1(b) is an explanatory drawing of a main part thereof while a gas turbine is being operated.

One example of a preferred embodiment according to the present invention is described with reference to FIGS. 1 and 2. A gas turbine 1 is composed of a turbine 2 and a compressor 3 connected directly to the turbine 2, and a generator 19 is connected thereto in a shafting arrangement. A high temperature gas G generated at a PFBC 31 is led into the turbine 2 from a high temperature gas pipe 4, and a high pressure air A of the compressor 3 is led into the PFBC 31 from a high pressure air pipe 6 surrounding the high temperature gas pipe 4. A chamber 5 is provided so as to closely connect to the turbine 2 and the compressor 3. The high temperature gas pipe 4 passes through within the chamber 5 and is connected to the turbine 2. A high temperature gas shut-off valve 10a is provided at a portion within the chamber 5 of said high temperature gas pipe 4. A portion near to the compressor 3 of the chamber 5 forms a high pressure air leading passage 9 surrounding a high temperature gas shut-off valve portion 10 having the high temperature gas pipe 4 and the high temperature gas shut-off valve 10a. Within the chamber 5, there are provided a first air passage 7a having a first selector valve 8a and connecting to the high pressure air leading passage 9 and a second air passage 7b having a second selector valve 8b and connecting to the high pressure air leading passage 9. The first air passage 7a is connected to the high temperature gas pipe 4 downstream of the high temperature gas shut-off valve 10a and the second air passage 7b is connected to the high pressure air pipe 6 provided outside of the chamber 5 to lead the high pressure air into the PFBC.

Figure 1B:
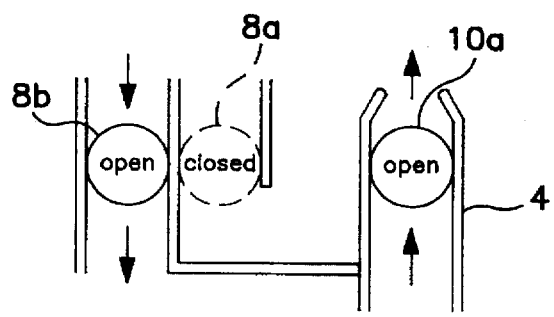

The high temperature gas shut-off valve 10a, the first air selector valve 8a and the second air selector valve 8b are provided in a row in the lateral direction as shown in FIG. 1 and are driven by a single valve shaft 12 driven by a valve drive portion 11; thus a common value operates each of the values. Each of the valves is driven so that either the high temperature gas shut-off valve 10a and the second air selector valve 8b are closed and the first air selector valve 8a is open, as shown in FIG. 1(a), or the high temperature gas shut-off valve 10a and the second air selector valve 8b are open and the first air selector valve 8a is closed, as shown in FIG. 1(b). Incidentally, in FIG. 1, numeral 8 designates a high pressure air selector valve portion composed of the first and second air selector valves 8a, 8b.

Figure 2:
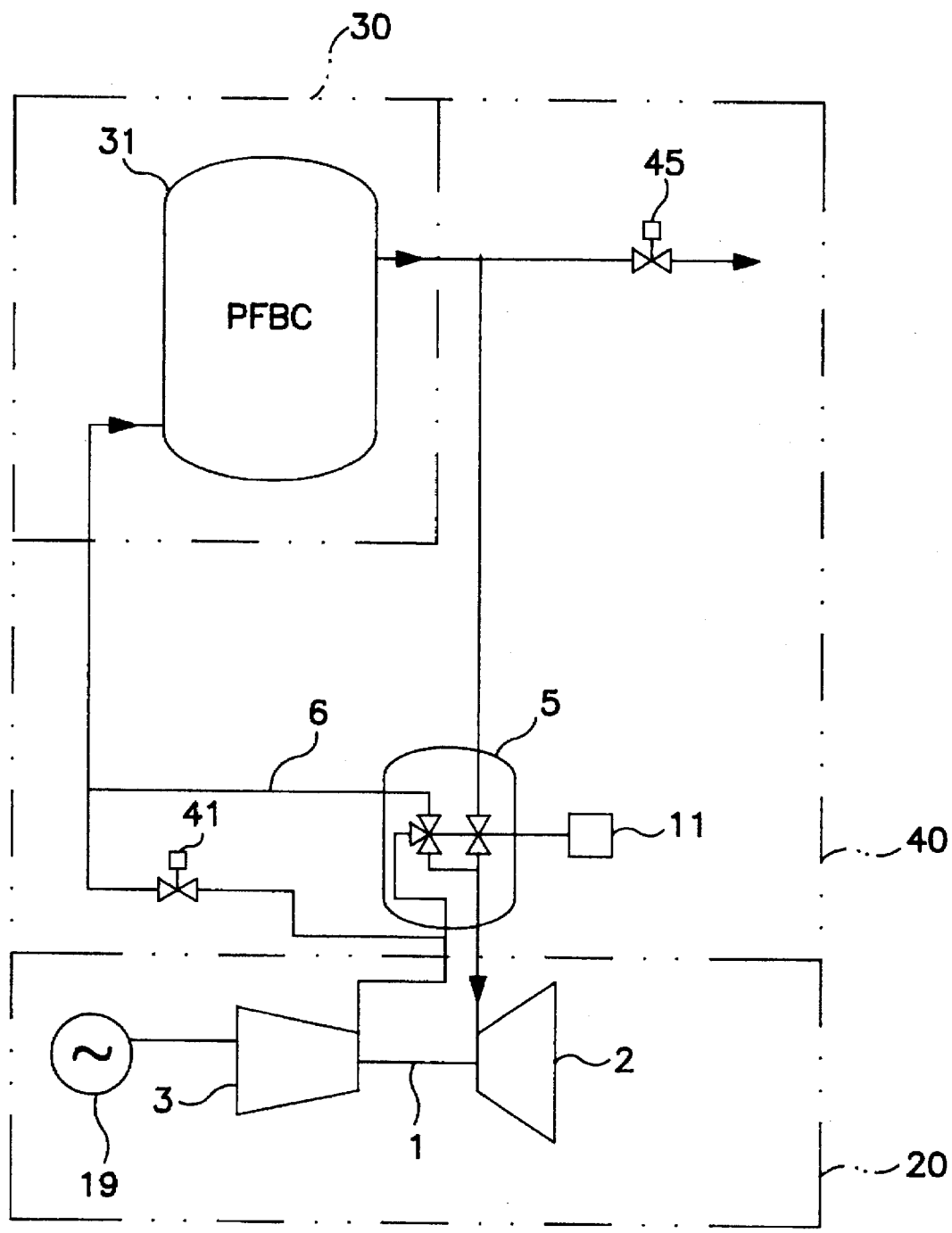
FIG. 2 is a schematic drawing showing a plant of a PFBC and a gas turbine including said first preferred embodiment.

In parallel with the high pressure air pipe 6, a pipe passage separating from the high pressure air pipe 6 between the chamber 5 and the compressor 3 and having a PFBC pressure-rise valve 41 is provided, as shown in FIG. 2, and the high pressure air pipe 6 is connected to the PFBC 31. In FIG. 2, numeral 45 designates a discharge valve of the PFBC 31, numeral 30 designates a PFBC portion composed of the PFBC 31, numeral 40 designates a high pressure air/high temperature gas pipe portion composed of the high temperature gas pipe 4, the chamber 5, the valve drive portion 11, the high pressure air pipe 6, the PFBC pressure-rise valve 41, the discharge valve 45, etc., and numeral 20 designates a gas turbine body portion composed of the gas turbine 1 comprising the turbine 2 and the compressor 3, and the generator 19.

In this preferred embodiment, at the time of the gas turbine being operated as shown in FIG. 1(b), the high temperature gas shut-off valve 10a and the second air selector valve 8b are opened and the first air selector valve 8a is closed by the valve drive portion 11 via the single valve shaft 12, and the high pressure air A from the compressor 3 is led into the PFBC 31 through the high pressure air leading passage 9, the second air passage 7b and the high pressure air pipe 6. The high temperature gas G generated by combustion of fuel is led into the turbine 2 through the high temperature gas pipe 4 and drives the gas turbine 1. When the gas turbine 1 stops as shown in FIG. 1(a), the high temperature gas shut-off valve 10a and the second air selector valve 8b are closed and the first air selector valve 8a is opened by the valve drive portion 11, and the high temperature gas G to be led into the turbine 2 from the PFBC 31 and the high pressure air A to be led into the PFBC 31 from the compressor 3 are shut off, and the high pressure air A from the compressor 3, which is rotating by, an inertia force, is led into the turbine 2 through the opened first air selector valve 8a, the first air passage 7a and the high temperature gas pipe 4. At this time, the high temperature gas generated at the PFBC 31 is discharged from the discharge valve 45. By the high pressure air A from the compressor 3 being led into the turbine 2, a discharge air passage of the compressor 3 is secured and an obstacle like a surging can be prevented.

Although the operation mentioned above does not much differ from that of the conventional apparatus in this preferred embodiment, the first and second air selector valves 8a, 8b and the high temperature gas shut-off valve 10a are provided within the chamber 5 and the high pressure air leading passage 9 of the high pressure air A from the compressor 3 is formed at a portion within the chamber 5 surrounding the high temperature gas pipe 4 where the high temperature gas shut-off valve 10a is provided. Accordingly, the high temperature gas pipe 4 and the high temperature gas shut-off valve 10a which need have only such pressure resistance sufficient to stand a pressure difference between the high temperature gas G and the high pressure air A, are made simple and compact in structure, and a leakage countermeasure become easier. Further, a heat insulation structure, except for a simple insulation structure of the outside of the chamber 5, is not required. Hence, an enhancement of reliability and a cost reduction of the apparatus can be realized.

Further, as the high temperature gas pipe 4, the high temperature gas shut-off valve 10a, the first and second air selector valves 8a, 8b, etc. are provided within the chamber 5, as mentioned above, these components can be placed closely to the gas turbine 1. Hence the problem of excess rotation of the gas turbine 1 at the time of a load shut-off becoming large due to excess piping volume in the conventional piping arrangement can be solved.

And yet, by employing the above-mentioned structure, the apparatus which is assembled at a factory can be transported and a construction period at the site can be remarkably reduced. Cost reduction thereby becomes possible.

Furthermore, as the first and second air selector valves 8a, 8b and the high temperature gas shut-off valve 10a, provided within the chamber 5, are driven by the valve drive portion 11 via the single valve shaft 12, necessary operations for shut-off of the high temperature gas G and a change of the high pressure air A can be done by a single valve open/close signal, and reliability can be enhanced.

Figure 3:
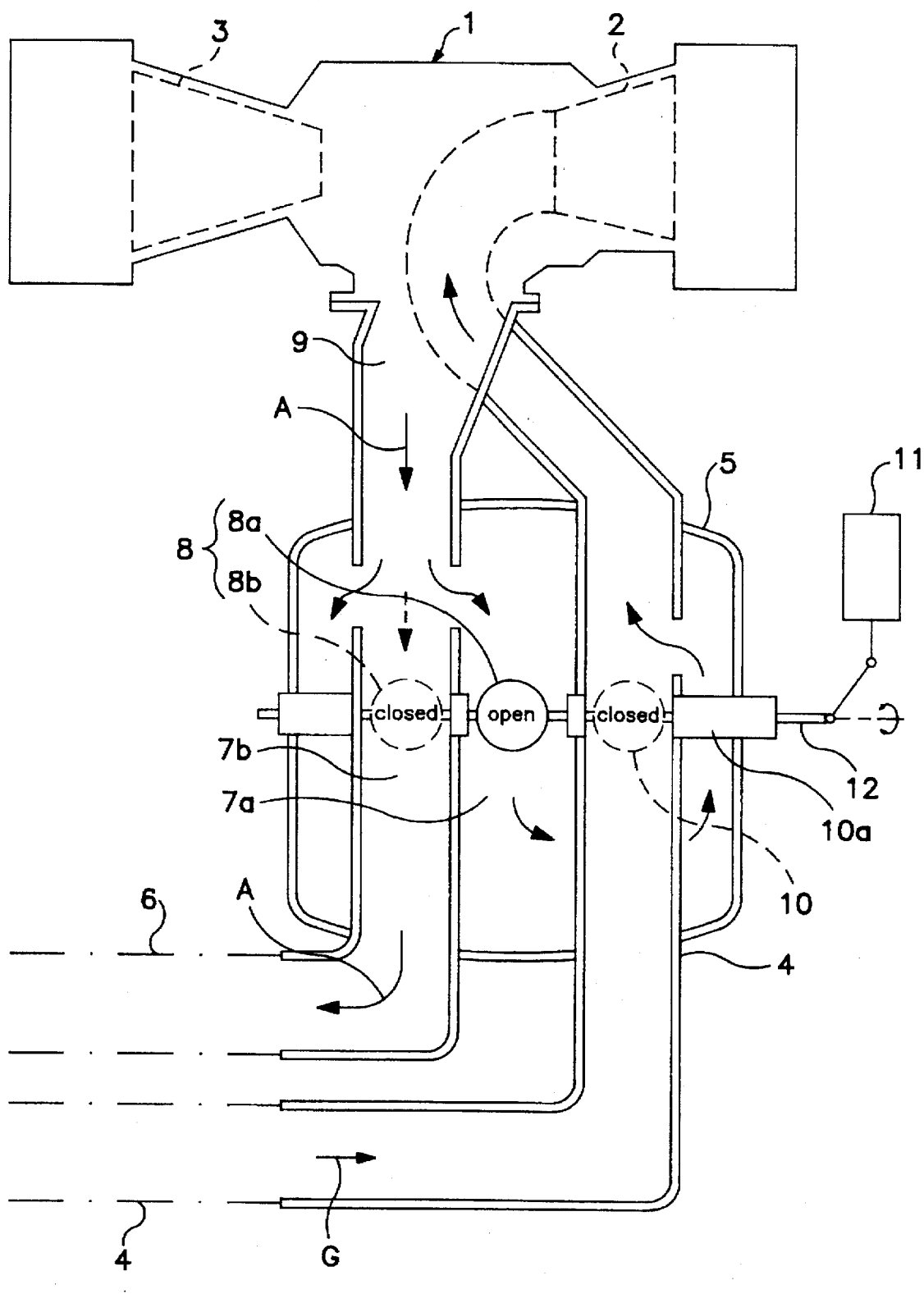
FIG. 3 is a sectional view showing a second preferred embodiment according to the present invention.
Figure 4:
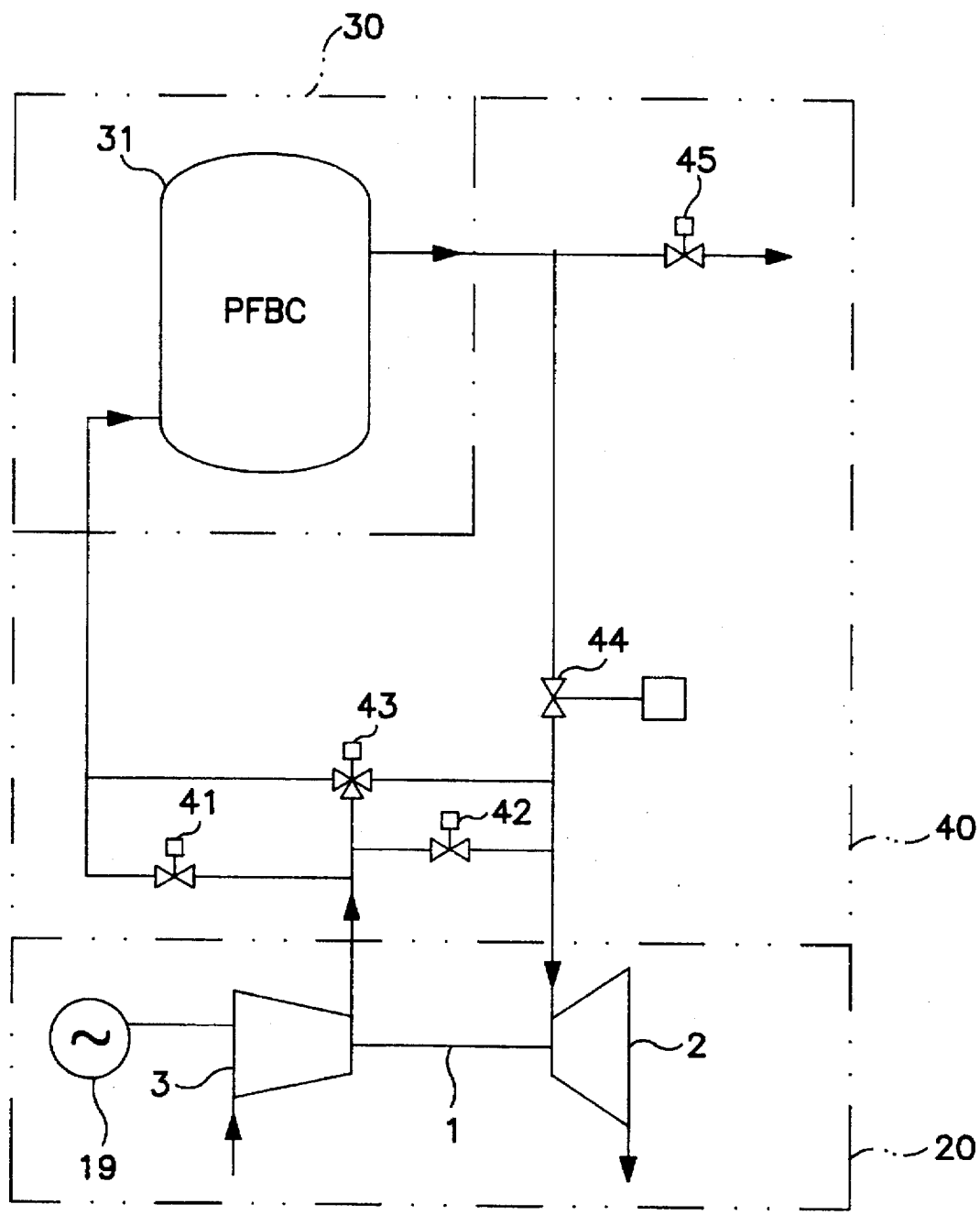
FIG. 4 is a schematic drawing showing a plant of a PFBC and a gas turbine in the prior art.

A second preferred embodiment according to the present invention is shown in FIG. 3. In this preferred embodiment, the construction is the same as that of the first preferred embodiment, except that the high pressure air leading passage 9 from the compressor 3 is provided without surrounding a high temperature gas pipe 4, and that the high pressure air pipe 6 leading high pressure air A of the compressor 3 into a PFBC 31 is provided without surrounding the high temperature gas pipe 4.

In this second preferred embodiment, by the high temperature gas pipe 4, a high temperature gas shut-off valve 10a, first and second air selector valves 8a, 8b, etc. being provided within a chamber 5, these components can be placed closely to a gas turbine 1. The problem of excess rotation of the gas turbine 1 becoming large at the time of load shut-off due to excess piping volume which had occurred in the prior art by dead spaces in the piping arrangement, can be solved.

Further, by the high temperature gas pipe 4, the high temperature gas shut-off valve 10a and the first and second air selector valves 8a, 8b, etc. being provided within the chamber 5 as mentioned above, the apparatus can be assembled at a factory and transported to a site as a unit. Hence construction period at the site can be remarkably reduced, and a cost reduction thereby becomes possible.

Furthermore, by the high temperature gas shut-off valve 10a and the first and second air selector valves 8a, 8b provided within the chamber 5 being driven by a single shaft 12 and a shut-off of the high temperature gas and a change of the high pressure air being performed thereby, changes of these valves can be done with one valve open/close signal. Hence a reliability can be enhanced and space can be reduced.

In an external combustion type gas turbine apparatus according to the present invention, by a high temperature gas pipe connecting a combustion furnace to a turbine, a high temperature gas shut-off valve provided in the high temperature gas pipe within a chamber, a high pressure air leading passage provided within the chamber, leading a high pressure air from a compressor, a first air passage provided within the chamber, connecting to the high pressure air leading passage and to a portion on the downstream side of the high temperature gas shut-off valve of the high temperature gas pipe via a first selector valve and a second air passage provided within the chamber, connecting to the high pressure air passage and to the combustion furnace via a second selector valve being provided, and in addition thereto, by the high temperature gas shut-off valve and the first and second selector valves being driven by a single valve shaft, the apparatus is made simple and compact, reliability can be enhanced and cost reductions can be attained, as mentioned above.

What is claimed is:

1. An external combustion gas turbine apparatus, comprising:

a combustion furnace, a turbine and a compressor;

a chamber;

a high temperature gas pipe connecting said combustion furnace with said turbine, said high temperature gas pipe extending through said chamber;

a high temperature gas shut-off valve for opening and closing said high temperature gas pipe disposed within said chamber;

a high pressure air passage leading from said compressor in to said chamber;

a first air passage within said chamber connecting said high pressure air passage with said high temperature gas pipe downstream of said high temperature gas shut-off valve, said first air passage having a first selector valve for opening and closing said first air passage;

a second air passage within said chamber connecting said high pressure air passage to said combustion furnace, said second air passage having a second selector valve for opening and closing said second air passage; and a common valve operator connected to said high temperature gas shut-off valve, said first selector valve and said second selector valve.

2. The external combustion gas turbine apparatus of claim 1, wherein said common valve operator comprises a single valve shaft connected to each of said high temperature gas shut-off valve, said first selector valve and said second selector valve, and a valve drive portion connected to said single valve shaft.

3. The external combustion gas turbine apparatus of claim 1, wherein said common valve operator interconnects said high temperature gas shut-off valve, said first selector valve and said second selector valve such that:

when said high temperature gas shut-off valve is in a closed position closing said high temperature gas pipe, said first selector valve is in an open position opening said first air passage and said second selector valve is in a closed position closing said high pressure air passage, and when said high temperature gas shut-off valve is in an open position opening said high temperature gas pipe, said first selector valve is in a closed position closing said first air passage and said second selector valve is in an open position opening said high pressure air passage.

4. The external combustion gas turbine apparatus of claim 1, wherein said high pressure air passage is defined at least in part by said chamber such that said high pressure air passage surrounds said high temperature gas pipe.

5. The external combustion gas turbine apparatus of claim 4, wherein said second air passage comprises an annular passage formed between said high temperature gas pipe and structure defining said high pressure air passage and surrounding said high temperature gas pipe.

6. The external combustion gas turbine apparatus of claim 1, wherein said second air passage comprises an annular passage formed between said high temperature gas pipe and structure defining said high pressure air passage and surrounding said high temperature gas pipe.

7. An external combustion gas turbine apparatus, comprising:

a combustion furnace, a turbine and a compressor;

a chamber;

a high temperature gas pipe connecting said combustion furnace with said turbine, said high temperature gas pipe extending through said chamber;

a high temperature gas shut-off valve for opening and closing said high temperature gas pipe disposed within said chamber;

a high pressure air passage leading from said compressor in to said chamber;

a first air passage within said chamber connecting said high pressure air passage with said high temperature gas pipe downstream of said high temperature gas shut-off valve, said first air passage having a first selector valve for opening and closing said first air passage; and a second air passage within said chamber connecting said high pressure air passage to said combustion furnace, said second air passage having a second selector valve for opening and closing said second air passage;

wherein said high pressure air passage extends through said chamber in parallel with said high temperature gas pipe and not surrounding said high temperature gas pipe.

8. The external combustion gas turbine apparatus of claim 7, wherein said second air passage having said second selector valve extends in parallel with said high temperature gas pipe and does not surround said high temperature gas pipe.

9. An external combustion gas turbine apparatus, comprising:

a combustion furnace, a turbine and a compressor;

a chamber;

a high temperature gas pipe connecting said combustion furnace with said turbine, said high temperature gas pipe extending through said chamber;

a high temperature gas shut-off valve for opening and closing said high temperature gas pipe disposed within said chamber;

a high pressure air passage leading from said compressor in to said chamber;

a first air passage within said chamber connecting said high pressure air passage with said high temperature gas pipe downstream of said high temperature gas shut-off valve, said first air passage having a first selector valve for opening and closing said first air passage; and a second air passage within said chamber connecting said high pressure air passage to said combustion furnace, said second air passage having a second selector valve for opening and closing said second air passage;

wherein said second air passage having said second selector valve extends in parallel with said high temperature gas pipe and does not surround said high temperature gas pipe.

10. An external combustion gas turbine apparatus, comprising:

a combustion furnace, a turbine and a compressor;

a chamber;

a high temperature gas pipe connecting said combustion furnace with said turbine, said high temperature gas pipe extending through said chamber;

a high temperature gas shut-off valve for opening and closing said high temperature gas pipe disposed within said chamber;

a high pressure air passage leading from said compressor in to said chamber;

a first air passage within said chamber connecting said high pressure air passage with said high temperature gas pipe downstream of said high temperature gas shut-off valve, said first air passage having a first selector valve for opening and closing said first air passage;

a second air passage within said chamber connecting said high pressure air passage to said combustion furnace, said second air passage having a second selector valve for opening and closing said second air passage; and a single valve shaft driving said high temperature gas shut-off valve, said first selector valve and said second selector valve.

11. An external combustion gas turbine apparatus, comprising:

a combustion furnace, a turbine and a compressor;

a chamber;

a high temperature gas pipe connecting said combustion furnace with said turbine, said high temperature gas pipe extending through said chamber;

a high temperature gas shut-off valve for opening and closing said high temperature gas pipe disposed within said chamber;

a high pressure air passage leading from said compressor in to said chamber;

a first air passage within said chamber connecting said high pressure air passage with said high temperature gas pipe downstream of said high temperature gas shut-off valve, said first air passage having a first selector valve for opening and closing said first air passage; and a second air passage within said chamber connecting said high pressure air passage to said combustion furnace, said second air passage having a second selector valve for opening and closing said second air passage;

wherein said high temperature gas shut-off valve, said first selector valve and said second selector valve are in a row and on the same plane.

* * * * *